United States Patent [19]

Watanabe et al.

[11] Patent Number: 4,738,852

[45] Date of Patent: Apr. 19, 1988

[54] FEEDSTUFF FOR SWINE

[75] Inventors: Nobuhiro Watanabe, Tokyo; Tadao Takase, Yokohama; Juichi Kasai, Tokyo, all of Japan

[73] Assignee: Showa Denko Kabushiki Kaisha, Tokyo, Japan

[21] Appl. No.: 757,773

[22] Filed: Jul. 23, 1985

Related U.S. Application Data

[63] Continuation of Ser. No. 496,692, May 20, 1983, abandoned.

[30] Foreign Application Priority Data

May 20, 1982 [JP] Japan .................. 57-83981
May 21, 1982 [JP] Japan .................. 57-84914

[51] Int. Cl.$^4$ .............................. C12K 1/22
[52] U.S. Cl. ........................ 426/2; 426/656; 426/807
[58] Field of Search ............... 426/656, 623, 630, 641, 426/807

[56] References Cited

U.S. PATENT DOCUMENTS 3,552,978  1/1971  Inklaar ...................... 426/641

OTHER PUBLICATIONS

Morrison, "Feeds and Feeding", The Morrison Publishing Co. (1957) pp. 842–853 and 1123–1128.

*Primary Examiner*—R. B. Penland

[57] ABSTRACT

A feedstuff for swine containing 0.001% to 0.1% by weight of L-tryptophan or its salt, in addition to a required amount of L-tryptophan component, together with the other essential constituents. The inclusion of the additional L-tryptophan or its salt results in increases in milk yields and body weight of dams, an increase in growth rate of farrows, a reduction of recurrence days of estrus, and an increase in the body weight gain of fattening pigs or hogs. A method for formulating the feedstuff containing the additional amount of L-tryptophan or its salt is also presented.

2 Claims, No Drawings

FEEDSTUFF FOR SWINE

This is a continuation of application Ser. No. 496,692, filed May 20, 1983, now abandoned.

BACKGROUND OF THE INVENTION (1) Field of the Invention

The present invention relates to a feedstuff for swine and, more specifically, relates to a feedstuff for swine containing an additional amount of L-tryptophan or its salt, in addition to a required amount of L-tryptophan, together with the other essential constituents.

(2) Description of the Prior Art

Feedstuffs for swine are generally divided into those for suckling pigs, those for pigs including yound gilts, young boars, and adult sires, those for breeding swines or sows, and those for lactating sows, depending upon their ages and usage. Raw materials and guaranteed amounts of ingredients are decided upon so that the feedstuffs are most desirably adapted for the desired purposes, taking into consideration the required nutrients, feed efficiencies, economic factors, and other factors.

As essential (or indispensable) amino acids for swine, the following ten (or twelve) amino acids are known: L-arginine, L-histidine, L-isoleucine, L-leucine, L-lysine, L-methionine, L-phenylalanine, L-threonine, L-tryptophan, and L-valine (and L-cystine, and L-tyrosine). All these essential amino acids should be present in the required amounts in the feedstuffs. The required amounts of the essential amino acids are set forth in NRC (National Research Council) Requirements or Japanese Feeding Standard. These standard requirements depend upon the kinds of swines. It is well-known in the art that, if the content of a certain amino acid is less than the required amount, the effectively available amounts of the other essential amino acids are limited to the level of said certain amino acid. This means that the extra amounts of said other essential amino acids are wastefully consumed. Such an amino acid is called a first-limiting amino acid. The kind of the limiting amino acid depends upon the sources of feedstuffs. It is reported, for example, that lysine is the first-limiting amino acid and tryptophan is the "second-limiting" amino acid in milo and corn. On the other hand, tryptophan is the first-limiting amino acid in fishmeals and methionine is the first-limiting amino acid in soybean meal.

The above-mentioned amino acids are contained in the form of protein in the feedstuffs. The feedstuffs are generally prepared from, for example, corn and milo as a carbohydrate source and soybean meal and fishmeals as a protein source. Commercially available feedstuffs for swine generally contain about 0.15% to 0.25% by weight of tryptophan component as a protein-constituting amino acid, although this tryptophan content largely depends upon the breeding or growing period of swines. This tryptophan content sufficiently satisfies that of nutrient requirements growing swine set forth in the Japanese Feeding Standard issued in 1975 (i.e., 0.11% to 0.18% by weight). According to the prior studies, the effective availability of tryptophan contained as a protein in the feedstuffs is about 50% to about 80% of free tryptophan (i.e., tryptophan not in the form of the constituent of protein). The tryptophan content in the commercially available feedstuffs is determined by multiplying the tryptophan requirement by the effective availability of tryptophan. It has been believed that the further addition of tryptophan to the feedstuffs does not have any significant effects on, for example, increases in milk yields and body weight of dams, an increase in growth rate of farrows, a reduction of recurrence days of estrus, and an increase in the body weight gain of fattening pigs or hogs.

SUMMARY OF THE INVENTION

An object of the present invention is to provide a feedstuff for swine capable of increasing the milk yield of dams, increasing the growth rate of farrows, increasing the body weight of weaning pigs, reducing the recurrence days of estrus of dams, and increasing the body weight gain of fattening pigs or hogs.

Other objects and advantages of the present invention will be apparent from the following description.

In accordance with the present invention, there is provided a feedstuff for swine containing 0.001% to 0.1% by weight of L-tryptophan or its salt as a feed additive, in addition to a required amount of L-tryptophan component, together with the other essential constituents.

In accordance with the present invention, there is also provided a method for formulating a feedstuff for swine comprising adding 0.001% to 0.1% by weight, based on the total weight of the feedstuff, of additional L-tryptophan or a salt thereof, as a feed additive to a feedstuff containing a required amount of L-tryptophan, as a protein constituent, together with the other essential ingredients.

DESCRIPTION OF THE PREFERRED EMBODIMENT

According to the present invention, the above-mentioned objects can be achieved by incorporating 0.001% to 0.1% by weight, desirably 0.005% to 0.02% by weight of free L-tryptophan or a salt thereof to feedstuffs for swines containing the essential ingredients including 0.15% to 0.30% by weight of protein constituting tryptophan in such amounts that the nutrient requirements of swine set forth in NRC Requirements or Japanese Feeding Standards. The feedstuffs to which the free L-tryptophan or its salt is additionally added generally contain, as essentiall ingredients, crude proteins, digestible nutrients, crude fibers, crude ashes, amino acids including the required amount of tryptophan, vitamines, and mineral elements. It has been unexpected that the further addition of free L-tryptophan or it salt ("L-tryptophan" below) in a small amount (i.e., less than about 7% of the nutrient requirement) can result in remarkable increases in the milk yield and body weight of dams, remarkable increases in the growth rate and average body weight of farrows and pigs, reduction of recurrence days of estrus after weaning, reduction of a suckling period, remarkable increases in the body weight gain, and in the cross-sectional area and weight of loin of fattening hogs, and a remarkable increase in the feed requirement of fattening pigs or hogs. These remarkable improvements cannot be obtained even if the content of the protein-form tryptophan in the feedstuffs is increased by 0.03% to 0.1% by weight instead of the addition of the free L-tryptophan. The reason that the above-mentioned unexpected results can not be obtained from the use of protein-form tryptophan but obtained from the use of free L-tryptophan is not clearly understood. However, it would seem that, without prejudice to the invention, the above-mentioned phenomenon is related to the available efficiency, in the swine, of the protein-form tryptophan contained in the feedstuffs.

The salts of L-tryptophan can be in the form of alkali metal salts (e.g., Na salt, K salt), alkaline earth metal salts (e.g., Ca salt, Mg salt), ammonium salt, or mineral acid salts (e.g., hydrochloride, sulfate, nitrate, phosphate).

The free tryptophan to be added to the feedstuffs for swine can be either L-tryptophan or DL-tryptophan, but the use of free L-tryptophan is desirable for the reason that the desired effects can be obtained even when L-tryptophan is added in a low concentration. The free tryptophan can be formulated to the feedstuffs in any form of powder, granule, pellets or liquid, but the use of the powdered, granular, or pelletized form is desirable due to the easy handling and easy intake of the feedstuffs by swines.

The free tryptophan can be directly fed to swines in the form of powder having a purity of 98% or more, but it can be desirably fed to swines by being diluted in, for example, wheat bran or wheat flour. The free tryptophan can be mixed with any substance so long as it does not react with the tryptophan to depress the effects of the tryptophan. The free tryptophan can be added to the feedstuffs in such an amount that the content of the additional free tryptophan in the feedstuffs is within the range of from 0.001% to 0.1% by weight, desirably 0.005% to 0.02% by weight. A content of free tryptophan of less than 0.001% by weight does not result in the desired effects, whereas a content of free tryptophan of more than 0.1% by weight is not economical.

EXAMPLES

The present invention will now be further illustrated by, but is by no means limited to, the following examples, in which all percentages are expressed on a weight basis unless otherwise specified.

Example 1

An assorted feedstuff containing 58% of corn, 20% of milo, 5% of fishmeals, 15% of soybean meal, and 2% of vitamins and mineral elements was formulated to satisfy the nutrient requirements of swine according to the Japanese Feeding Standard. The amino acid analytical data of the feedstuff are as follows:

TABLE 1

| Amino acid | Foodstuffs of example 1 (%) | Japanese standard (%) | NRC requirement (%) |
| --- | --- | --- | --- |
| L-Arginine | 1.08 | 0.34 | 0.40 |
| L-Histidine | 0.42 | 0.26 | 0.25 |
| L-Isoleucine | 0.69 | 0.67 | 0.39 |
| L-Leucine | 1.56 | 0.99 | 0.70 |
| L-Lysine | 0.78 | 0.60 | 0.58 |
| L-Methionine + Cystine | 0.59 | 0.36 | 0.36 |
| L-Phenylalanine + Tyrosine | 1.32 | 1.00 | 0.85 |
| L-Threonine | 0.60 | 0.51 | 0.43 |
| L-Tryptophan | 0.15 | 0.13 | 0.12 |
| L-Valine | 0.83 | 0.68 | 0.55 |

Twenty sows were used in an experiment to evaluate the tryptophan addition effect. The sows were randomly divided into two groups, i.e., a control group and a test group. Ten sows belonging to the control group were fed with the above-prepared standard feedstuff. On the other hand, ten sows belonging to the test group were fed with the feedstuff prepared by adding 0.01% of free L-tryptophan to the above-prepared standard feedstuff. Both groups was fed twice a day (i.e., morning and evening), during the lactation, from 1 week before the delivery (or parturition). The lactation period was 30 days both in the control and test groups. The feeding amounts were 2.5 kg/day as a basal feeding and 0.4 kg/day/pig as an additional feeding both in the control and test groups. Water was full feeding. The results are shown in Table 2 below.

As is clear from the results shown in Table 2, significant differences in decreases in numbers of the still birth and the premature pig, an increase in numbers of the weaning pig, and also an increase in an average body weight of the pigs at the weaning are observed in the test group as compared with the control group. The recurrence days of estrus were reduced about 3 days and the estrus conditions were good.

TABLE 2

| Group | Condition of udder | Pigs at birth | | | | Number of weaning pig | | Days until recurrence of estrus*[2] |
| --- | --- | --- | --- | --- | --- | --- | --- | --- |
| | | Still birth | Premature pig*[1] | Normal | Average body weight (kg/pig) | Number | Average body weight (kg/pig) | |
| Control | Ordinary | 6 | 6 | 94 | 1.18 | 84 | 7.1 | 5–12 |
| Test | Good | 2 | 4 | 104 | 1.20 | 98 | 7.9 | 4–7 |

*[1] Pigs having a body weight of less than 800 g
*[2] Days from the weaning date

EXAMPLE 2

Twenty sows were used in an experiment to evaluate the tryptophan addition effect on the growth rate and body weight during the lactation. The sows were randomly divided into two groups, i.e., a control group and a test group. Ten sows of the control group were fed with the assorted feedstuff prepared in the same manner as in Example 1. On the other hand, ten sows of the test group were fed with the feedstuff prepared by adding 200 ppm of free L-tryptophan to the above feedstuff. The feeding in both groups was conducted, during the lactation, from 1 week before the delivery (or parturition) in the same manner as described in Example 1. The results are shown in Table 3 below.

As is clear from the results shown in Table 3, the average body weight of the pigs of the test group at the weaning is larger by 0.9 kg/pig than that of the control group and the standard deviation thereof is smaller by 0.5 kg/pig than that of the control group, although the average body weight and the standard deviation thereof of the test and control groups at the birth are substantially the same. Thus, according to the present invention, large pigs having a more uniform body weight can be obtained.

TABLE 3

| Group | At birth | | At weaning | | |
|---|---|---|---|---|---|
| | Average body weight (kg/pig) | Standard deviation (kg) | Weaning days | Average body weight (kg/pig) | Standard deviation |
| Control | 1.20 | 0.24 | 30 | 7.2 | 0.92 |
| Test | 1.21 | 0.22 | 30 | 8.3 | 0.42 |

EXAMPLE 3

An assorted feedstuff containing 59.8% of corn, 4.1% of soybean meal, 22.9% of bran and 3.2% of vitamin and mineral elements was formulated to satisfy the nutrient requirement of swine according to the NRC requirement. The amino acid concentrations of the feedstuff are as follows:

| Amino acid component | % |
|---|---|
| Arginine | 1.07 |
| Histidine | 0.40 |
| Isoleucine | 0.59 |
| Leucine | 1.32 |
| Lysine | 0.66 |
| Methionine + Cystine | 0.50 |
| Phenylalanine + Tyrosine | 1.16 |
| Threonine | 0.51 |
| Tryptophan | 0.16 |
| Valine | 0.74 |

Twenty sows (Large whight, second delivery) were used in an experiment to evaluate the tryptophan addition effect. The sows were randomly divided into two groups, test and control groups, each group were ten sows. The test group was fed with the feedstuff formulated by adding 100 ppm of free L-tryptophan to the above feedstuff. The experimental procedure was the same as in Example 1.

The results are shown in Table 4 below.

TABLE 4

| | Milk yield | | | |
|---|---|---|---|---|
| | kg/day/sow Weekes after delivery | | | |
| | 1W | 2W | 3W | 4W |
| Test group | 5.38 | 6.16 | 6.89 | 6.81 |
| Control group | 4.92 | 4.82 | 4.98 | 5.36 |

| | Milk component | | | |
|---|---|---|---|---|
| | | after delivery days | | |
| | colostrum | 10 | 17 | 25 |
| (1) Protein (%) | | | | |
| Test group | 16.05 | 5.10 | 4.84 | 5.25 |
| Control group | 15.82 | 5.00 | 5.24 | 5.33 |
| (2) Fat (%) | | | | |
| Test group | 3.01 | 8.78 | 8.61 | 10.26 |
| Control group | 3.16 | 9.03 | 9.03 | 9.72 |
| (3) Lactose (%) | | | | |
| Test group | 4.42 | 4.44 | 4.74 | 3.41 |
| Control group | 3.46 | 5.41 | 4.83 | 3.88 |

As is clear from the results shown in Table 4, the milk yields were increased by the addition of free L-tryptophan, while the contents of the essential milk components were not changed.

EXAMPLE 4

An assorted feedstuff containing crude protein, digestable energy, digestable nutrients, amino acids, vitamins, and mineral elements in amounts more than the nutrient requirements of swine according to the following Japanese Feeding Standard was formulated.

| | Japanese Feeding Standard | | | |
|---|---|---|---|---|
| | Former period (10–20 kg)*1 | Middle period | | Latter period (60–100 kg)*1 |
| | | (20–35 kg)*1 | (35–60 kg)*1 | |
| Crude protein | 18 | 16 | 14 | 13 |
| TDN*2 | 72 | 70 | 70 | 70 |
| Tryptophan | 0.15 | 0.13 | 0.11 | 0.11 |

*1Average body weight
*2Total digestable nutrient

Then, free L-tryptophan was added to the assorted feedstuff obtained above in such an amount that the content of the added L-tryptophan in the resultant feedstuff was 100 ppm.

Fifteen Landrace swines including 8 sows and 7 hogs and having an average body weight of 9 kg were used in an experiment to evaluate the growth rate and the feedstuff requirements.

The contents of the main ingredients in the feedstuffs were as follows:

| | Former period (9–20 kg)*1 | Middle period (20–50 kg)*1 | Latter period (50–105 kg)*1 |
|---|---|---|---|
| Crude protein (%) | 18.2 | 16.5 | 15.1 |
| Tryptophan (%) | 0.21 | 0.15 | 0.13 |
| TDN*2 (%) | 78 | 75 | 73 |

*1Average body weight
*2Total digestable nutrient

Full feeding was carried out until the average body weight of the swines became 52 kg and, thereafter, controlled feeding (i.e., twice a day) was carried out. The test results are shown in Table 5.

| | Former period (9–20 kg)*1 | Middle period (20–50 kg)*2 | Latter period (50–105 kg)*1 |
|---|---|---|---|
| Standard deviation $(\sigma_{n-1})$ (kg) | 1.5 | 3.6 | 5.8 |
| Feedstuff requirement | 1.63 | 2.13 | 2.73 |
| Average body weight gain per day (g) | 610 | 720 | 980 |
| Growth period (day) | 18 | 45 | 54 |

*1Average body weight

EXAMPLE 5

An assorted feedstuff having the contents corresponding to those for fattening swines at a 20 to 35 kg body weight age according to Japanese Feeding Standard and further containing sufficient amounts of amino acids, vitamins, and mineral elements was used to evaluate the growth of 14 Landrace swines including 7 sows and 7 hogs. No additional L-tryptophan was added to the feedstuff. The contents of the main ingredients of the feedstuff were as follows:

| Component | % |
| --- | --- |
| Crude protein | 16 |
| TDN[*1] | 76 |
| Tryptophane | 0.14 |

[*1]Total digestable nutrient

The average weight of the swines at the beginning of the test was 20 kg. The full feeding was carried out until the average body weight of the swines became 54 kg and, thereafter, controlled feeding (i.e., twice a day) was carried out. The test results are shown in Table 6.

TABLE 6

| Average body weight (kg) | 20 → 54 | 54 → 103 |
| --- | --- | --- |
| Standard deviation ($\sigma_{n-1}$) (kg) | 2.69 | 3.46 |
| Average body weight gain per day (g) | 642 | 890 |
| Growth period (day) | 53 | 55 |

The results obtained in Examples 4 and 5 are summarized as follows:

TABLE 7

|  | Example 4[*1] | Example 5 |
| --- | --- | --- |
| Addition amount of L-tryptophan (ppm) | 100 | 0 |
| Growth period (day) | 98 | 111 |
| Feedstuff requirement | 2.57 | 3.23 |
| Ranking of dressed carcass (80% of total dressed carcass) | good quality | good quality |

*Average body weight of from 20 kg to 105 kg

As is clear from Table 7, the growth test results of Example 4 are surprisingly superior to those of Example 5, in spite of the fact that the contents of both crude proteins and TDN in the feedstuff of the latter period of Example 4 are lower than those of Example 5.

EXAMPLE 6

An assorted feedstuff containing crude protein digestable energy, digestable nutrients, amino acids, vitamins, and mineral elements in amounts more than the nutrient requirements of pig according to the Japanese Feeding Standard was formulated. The amino acid analytical data of the feedstuff are as follows.

| Amino Acid (%) | Former period (8 35 kg)[*1] | Latter period (35 101 kg)[*1] |
| --- | --- | --- |
| Arginine | 0.93 | 0.84 |
| Histidine | 0.43 | 0.43 |
| Isoleucine | 0.70 | 0.59 |
| Leucine | 1.47 | 1.47 |
| Lysine | 0.93 | 0.74 |
| Methionine + Cystine | 0.73 | 0.61 |
| Phenylalanine + Tyrosine | 1.07 | 0.99 |
| Threonine | 0.67 | 0.59 |
| Tryptophan | 0.20 | 0.17 |
| Valine | 0.83 | 0.72 |

[*1]Average body weight

Forty three-way cross (Large whight × Hampshire) having an average body weight of about 8 kg were used in an experiment to evaluate the growth rate and the feedstuff requirement. Full feeding was carried out until an average body weight of pigs becomes 35 kg and, thereafter, controlled feeding was carried out. The pigs were randomly divided into a test group and a control group.

The control group was fed with the above prepared standard feedstuff. On the other hand, the test group was fed with standard feedstuff including the additional 100 ppm of free L-tryptophan.

The results are shown in Table 8 below.

TABLE 8

|  | Test group | Control group |
| --- | --- | --- |
| Starting average body weight | 8.1 kg | 8.0 kg |
| 78 day growing | 63.7 kg | 62.0 kg |
| 124 day growing | 96.5 kg | 87.6 kg |
| Growing finished day | 135 day | 145 day |
| Finished weight | 102.5 kg | 99.7 kg |
| Daily gain | 0.70 kg/day | 0.63 kg/day |
| Feedstuff requirement | 2.93 | 3.20 |

As is clear from the results shown in Table 8, significant differences in the daily gain and feedstuff requirement have been observed by the addition of 100 ppm of L-tryptophan as shown in the test group as compared with the control group.

What is claimed is:

1. A method for improving the performance of swine comprising feeding dams, farrows, weaning pigs and fattening pigs a feedstuff consisting essentially of crude proteins, crude fibers, amino acids in the form of proteins containing 0.12% to 0.3% by weight proteinform tryptophan, vitamins and mineral elements, which meets all of the nutrient requirements for a given population of swines set forth in National Research Council Requirements or Japanese Feeding Standards in admixture with 0.001% to 0.1% by weight of free L-tryptophan or a salt thereof based on the total weight of the feedstuff thereby increasing the growth rate of farrows, increasing the body weight of weaning pigs, reducing the recurrence days of estrus of dams or increasing the body weight gain of fattening pigs.

2. The method as claimed in claim 1, wherein the amount of the free L-tryptophan is 0.005% to 0.02% by weight.

* * * * *